US006376583B1

(12) United States Patent
Winkler et al.

(10) Patent No.: US 6,376,583 B1
(45) Date of Patent: Apr. 23, 2002

(54) PROCESS FOR PREPARING STARCH AND EPOXY-BASED THERMOPLASTIC POLYMER COMPOSITIONS

(75) Inventors: Marie S. Winkler, Lake Jackson; Tricia S. Berry, Austin; Donald E. Kirkpatrick, Lake Jackson, all of TX (US); David F. Pawlowski, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/507,267

(22) Filed: Feb. 18, 2000

Related U.S. Application Data
(60) Provisional application No. 60/124,056, filed on Mar. 12, 1999.

(51) Int. Cl.$^7$ .............................. C08J 5/10; C08L 3/00; C08L 89/00
(52) U.S. Cl. ............................ 524/47; 524/52
(58) Field of Search ............................ 524/47, 48, 50, 524/51, 52, 53

(56) References Cited

U.S. PATENT DOCUMENTS

| | | |
|---|---|---|
| 3,137,592 A | 6/1964 | Protzman et al. |
| 4,454,268 A | 6/1984 | Otey et al. |
| 4,673,438 A | 6/1987 | Wittwer et al. |
| 5,095,054 A | 3/1992 | Lay et al. |
| 5,164,472 A | 11/1992 | White et al. |
| 5,171,820 A | 12/1992 | Mang et al. |
| 5,275,853 A | 1/1994 | Silvis et al. |
| 5,496,910 A | 3/1996 | Mang et al. |
| 5,665,786 A | 9/1997 | Xu et al. |
| 5,821,286 A | 10/1998 | Xu et al. |
| 5,852,078 A | 12/1998 | Willett et al. |

FOREIGN PATENT DOCUMENTS

| | | |
|---|---|---|
| WO | 97/23564 | 7/1997 |

OTHER PUBLICATIONS

Derwent Abstract of JP 5050492.
Derwent Abstract of JP 11060740.
Reinking, N. H. et al. "Polyhydroxyethers. I. Effect of Structure on Properties of High Molecular Weight Polymers from Dihydric Phenols and Epichlorohydrin," *Journal of Applied Polymer Science*, vol. 7, pp. 2135–2144, (1963).
Shogren, Randal L. et al., "Development of Starch Based Plastics—A Reexamination of Selected Polymer Systems in Historical Perspective," Starch/Starke, No. 45, pp. 276–280, (1993).
Mercier B. C. et al., "Effect of Extrusion–Cooking on Potato Starch Using a Twin Screw French Extruder," Die Starke, No. 29, pp. 48–52, (1977).
Encyclopedia of Polymer Science and Engineering, Second Edition, vol. 3, 1985.

*Primary Examiner*—James J. Seidleck
*Assistant Examiner*—U. K Rajguru
(74) *Attorney, Agent, or Firm*—Nemia C. Damocles

(57) ABSTRACT

A process for preparing a starch-based thermoplastic hydroxy-functional polyether comprising (1) feeding from about 40 to about 98 weight percent starch and from about 2 to about 60 weight percent of a thermoplastic hydroxy-functional polyether derived from monomers containing one or more epoxy groups into a processing equipment at a temperature and for a time sufficient to provide a compounded mixture of the components and then (2) forming the compounded mixture into pellets. The pellets are suitable for injection molding and other thermal processes.

6 Claims, No Drawings

PROCESS FOR PREPARING STARCH AND EPOXY-BASED THERMOPLASTIC POLYMER COMPOSITIONS

CROSS-REFERENCE TO RELATED APPLICATION

This application claims the benefit of U.S. Provisional Application No. 60/124,056, filed Mar. 12, 1999.

BACKGROUND OF THE INVENTION

This invention relates to a process for preparing starched-based thermoplastic polymer compositions and the compositions prepared thereby.

U.S. Pat. No. 3,137,592 issued to Protzman describes a process which comprises mixing starch with about 22 percent to about 67 percent water based on the weight of the starch raw material dry substance. The starch may or may not be modified. The mixture of the starch and water is fed under pressure onto a rotating screw, advanced by means of the rotation of the screw while maintaining an increased temperature by means of external heaters and the shearing action of the screw. The material is mechanically worked in a confining chamber formed by the screw and barrel of the extruder and then transformed into a homogeneous viscous fluid mass.

U.S. Pat. No. 4,673,438 issued to Wittwer et al., describes a starch/water composition obtained by maintaining a starch/water composition at a water content of 5 to 30 percent by weight of the composition under controlled conditions of temperature and pressure, heating the starch/water composition under pressure above its glass transition temperature and melting point while maintaining said water content to form a melt and further heating and plasticizing the molten starch/water composition to dissolve the starch in the water to form melt as a molecularly dispersed solution of said melt.

U.S. Pat. No. 4,454,268 issued to Otey describes a process for preparing a starch-based film from a composition of a blend of starch, water and one or more polymers. Otey teaches that the starch should be highly gelatinized, which means that all or substantially all of the starch granules are sufficiently swollen and disrupted, that they form a smooth viscous dispersion in water. The mixture is then processed at 105° C. to 110° C. at elevated pressures and extruded as a film.

Mercier, C., Effect of Extrusion-Cooking, *Die Starke* 29. Jahrg. 1977/ Nr. 2 S.48–52 (Mercier) describes a process for extruding unmodified potato starch having a moisture content before extrusion of 23 percent by weight using a semi-industrial twin-screw extruder.

Randall et al., "Development of Starch Based Plastics—A Reexamination of Selected Polymer Systems in Historical Perspective," *Starch/Starke* 45 (1993) Nr. 8, S. 276–280, has argued that the concept of "destructurization" is just a new name for an old concept of "gelatinization" of starch that first originated in the food industry. The term "gelatinization" refers to the process of disruption of the granular structure of starch by heating a starch suspension at temperatures in the range of 50° C. to 80° C.

In order to produce a satisfactory extruded article, starch must be combined with other polymers, because extrusion of starch alone produces a brittle, water-sensitive article. U.S. Pat. No. 5,095,054 issued to Lay et al., describes the preparation of starch-based compositions comprising destructurized starch and water-insoluble polymers.

Such prior art patents and publications do not describe compounding starch, water and thermoplastic polymers in the form of strands and then pelletizing the strands. Fabricators must purchase and maintain an inventory of the starch and thermoplastic polymers or handle powders of the starch and thermoplastic polymers for fabrication into a finished article. It would be desirable to provide a process for preparing a starch and epoxy-based thermoplastic polymer composition comprising compounding starch, epoxy thermoplastic polymer and water into a pellet form which is convenient and desirable for some fabricators.

SUMMARY OF THE INVENTION

The present invention is a process for preparing a starch-based thermoplastic hydroxy-functional polyether comprising (1) feeding from about 40 to about 98 weight percent starch and from about 2 to about 60 weight percent of a thermoplastic hydroxy-functional polyether derived from monomers containing one or more epoxy groups into a typical processing equipment, including thermoplastic, rubber and food mixing equipment, at a temperature and for a time sufficient to provide a compounded mixture of the components and then (2) forming the compounded mixture into pellets.

The hydroxy-functional polyether has been found to adhere strongly to starch. This adhesion, and the generally good physical properties of hydroxy-functional polyether, allows for the preparation of hitherto unknown materials with useful physical properties.

The starch-based thermoplastic compositions of the present invention are suitable for use in fabricating molded, extruded or foamed articles, containers, films film laminates, or coatings using conventional fabricating techniques such as extrusion, compression molding, injection molding, blow molding and similar fabrication techniques commonly used to produce such articles. Examples of such articles include films, foams, sheets, pipes, rods, bags, boxes, meat trays, egg cartons, cups and plates, cutlery, and other disposable consumer items. The compositions of the present invention are also suitable for use as adhesives and encapsulating agents.

DETAILED DESCRIPTION OF THE INVENTION

Preferably, the hydroxy-functional polyethers employed in the practice of the present invention are:

(1) hydroxy-functional polyethers having repeating units represented by the Formula I:

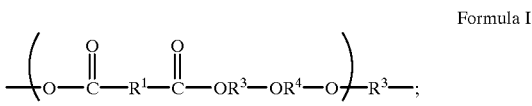

Formula I (2) hydroxy-functional polyethers having repeating units represented by the Formula II:

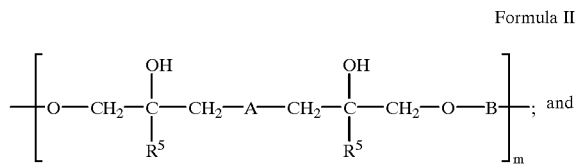

Formula II

; and (3) hydroxy-functional polyethers having repeating units represented by the Formula III:

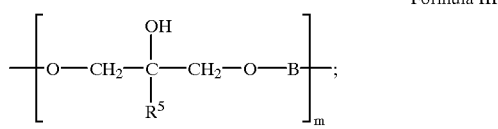

Formula III wherein $R^1$ individually represents a divalent organic moiety which is predominantly hydrocarbylene, or a combination of different organic moieties which are predominantly hydrocarbylene; $R^3$ is

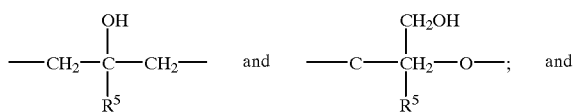

$R^4$ is

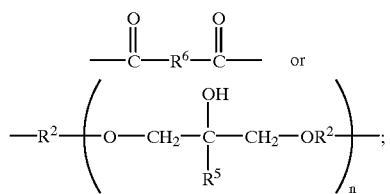

wherein $R^2$ is a divalent organic moiety which is predominantly hydrocarbylene or

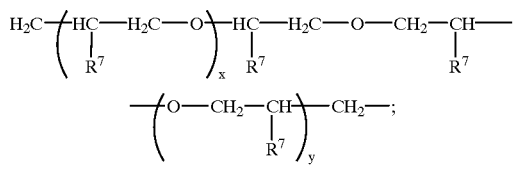

$R^5$ is hydrogen or alkyl; $R^6$ is independently an organic moiety which is predominantly hydrocarbylene; $R^7$ is independently hydrogen or methyl; A is an amine moiety or a combination of different amine moieties; B is a divalent organic moiety which is predominantly hydrocarbylene; m is an integer from 10 to about 1000; n is an integer from 0 to about 100; and x and y are independently integers from 0 to 100.

The term "predominantly hydrocarbylene" is defined as a divalent radical that is predominantly hydrocarbon, but which optionally contains a minor amount of a heteroatomic moiety such as oxygen, sulfur, imino, sulfonyl, and sulfoxyl.

Representative divalent organic moieties useful as $R^1$, $R^2$ and $R^6$ include alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, and alkylenesulfonylalkylene substituted with at least one hydroxyl group; and arylene, dialkylenearylene, diaryleneketone, diarylenesulfone, diarylene oxide and diarylene sulfide.

In the more preferred hydroxy-functional polyethers, $R^1$, $R^2$ and $R^6$ are independently methylene, ethylene, propylene, butylene, pentamethylene, hexamethylene, heptamethylene, octamethylene, nonamethylene, decamethylene, dodecamethylene, 1,4-cyclohexylene, 1,3-cyclohexylene or 1,2-cyclohexylene optionally substituted with at least one hydroxyl group, p-phenylene, m-phenylene, or 2,6-naphthalene, diphenyleneisopropylidene, sulfonyldiphenylene, carbonyldiphenylene, oxydiphenylene, or 9,9-fluorenediphenylene and n is from 0 to 10.

Preferably, A is 2-hydroxyethylimino-,2-hydroxypropylimino-, piperazenyl, or N,N'-bis(2-hydroxyethyl)-1,2-ethylenediimino-; B is isopropylidenediphenylene, 1,3-phenylene, or 1,4-phenylene; and $R^5$ is hydrogen.

The poly(hydroxy ester ethers) represented by Formula I are prepared by reacting diglycidyl esters of aliphatic or aromatic diacids such as diglycidyl terephthalate, or diglycidyl ethers of dihydric phenols or alcohols with aliphatic or aromatic diacids such as adipic or terephthalic acid as described in U.S. Pat. Nos. 5,171,820 and 5,496,910; and copending U.S. patent application Serial Nos. 131,110, filed Oct. 1, 1993; 278,361, filed Jul. 21, 1994; and 280,425, filed Jul. 26, 1994.

The poly(hydroxy amino ethers) represented by Formula II are prepared by contacting one or more of the diglycidyl ethers of a dihydric phenol with an amine having two amine hydrogens under conditions sufficient to cause the amine moieties to react with epoxy moieties to form a polymer backbone having amine linkages, ether linkages and pendant hydroxyl moieties. These polyethers are described in U.S. Pat. No. 5,275,853. These polyethers can also be prepared by contacting a diglycidyl ether or an epihalohydrin with a difunctional amine.

The poly(hydroxy ethers) represented by Formula III can be prepared by contacting a diglycidyl ether or a combination of diglycidyl ethers with a dihydric phenol or combination of dihydric phenols using the process described in U.S. Pat. No. 5,164,472. Alternatively, the poly(hydroxy ethers) are obtained by allowing a dihydric phenol or a combination of dihydric phenols to react with an epihalohydrin by the process described by Reinking, Barnabeo, and Hale in the *Journal of Applied Polymer Science*, Volume 7, page 2135 (1963).

The term "starch" as used herein, refers to carbohydrates of natural, vegetable origin, composed mainly of amylose and/or amylopectin, and includes unmodified starches (native starches), physically modified starches, such as thermoplastic, gelatinized or cooked starches, starches with a modified acid value (pH) where acid has been added to lower the acid value of a starch to a range of from 3 to 6, gelatinized starches, ungelatinized starches, cross-linked starches and disrupted starches (starches which are not in particulate form). The starches can be in granular, particulate or powder form. The starches can be extracted from various plants, such as, for example, potatoes, tapioca, pea, and grains such as corn, rice, rye, oats and wheat.

The composition of the present invention may also contain various additives such as, for example, plasticizers, lubricants, pigments, foaming agents, extenders, stabilizers, chemical modifiers, and flow accelerators. Each of these additives is known and several types of each are commercially available.

While the amount of hydroxy-functional polyethers used depends on a variety of factors, including the specific polymer employed and the desired end uses of the composition, in general, the hydroxy-functional polyesters can be present in an amount of from about 2 to about 60 weight percent, preferably from about 4 to about 40 weight percent and, most preferably from about 5 to about 30 weight percent, based on the total weight of the hydroxy-functional polyester and starch.

In the most preferred embodiment of the present invention, the hydroxy-functional polyethers employed are the poly(hydroxy amino ethers) (PHAE). While the amounts of PHAE and starch used depend on a variety of factors, including the specific polymer employed and the desired end uses of the composition, in general, the PHAE can be present in an amount of from about 2 to about 60 weight percent, and the starch can be present in an amount of from about 40 to about 98 weight percent. Preferably the PHAE can be present in an amount of from about 4 to about 40 weight percent, most preferably, from about 5 to about 30 weight percent. Preferably, the starch can be present in an amount of from about 60 to about 96 weight percent and, most preferably, from about 70 to about 95 weight percent.

In general, the process for preparing the composition of the present invention comprises compounding a thermoplastic hydroxy-functional polyether derived from monomers containing one or more epoxy groups, starch and water and, optionally, other additives, such as those described previously. The compounding step can be done in a typical processing equipment including thermoplastic, rubber and food mixing equipment such as a single-screw extruder, twin-screw extruder, Haake mixer, a Banbury mixer, Farrel continuous mixer, pellet cooker, injection-molding machine and the like, at a temperature and for a time sufficient to provide a compounded mixture of the components. Preferably, the components are brought together and processed in an appropriate melt extruder from which the blend is extruded in the form of powder or strands. The powders or strands are then pelletized or formed into granules for injection molding and other thermal processes. Standard techniques and apparatuses well known in the art can be used for these processes.

Starch as received has some water present, but some water is typically lost during the compounding step. The water content of the compounded blend is in the range of from about 2 to about 40 weight percent, preferably from about 6 to about 30 weight percent and, most preferably, from about 8 to about 25 weight percent.

The compounded material can be fabricated into films using processes well known to those skilled in the art, such as by cast film extrusion, blown film extrusion, and can be incorporated in multilayer constructions such as coextruded cast or blown films, with or without intermediate adhesive layers or layers containing recycled scrap material from the fabrication process.

Although the invention is specifically described with respect to the preferred embodiment, that is, the process for preparing starch and epoxy-based thermoplastic polymer compositions, the present process is also applicable to the preparation of mixtures of thermoplastic hydroxy-functional polyethers and polysaccharides other than starch, modified polysaccharides, naturally-occurring fibers or particulate fillers.

Polysaccharides other than starch which can be employed in the practice of the present invention for preparing the composition are the different celluloses, hemicelluloses, xylanes, gums, pectins and pullulans. Polysaccharides are known and are described, for example, in Encyclopedia of Polymer Science and Engineering, 2nd edition, Volume 3, pages 226–263.

The modified polysaccharides which can be employed in the practice of the present invention for preparing the composition are the esters and ethers of polysaccharides, such as, for example, cellulose ethers and cellulose esters, or starch esters and starch ethers. Modified polysaccharides are known and are described, for example, in Encyclopedia of Polymer Science and Engineering, 2nd edition, Volume 3, pages 226–263.

Celluloses are known and are described, for example, in *Encyclopedia of Polymer Science and Technology*, 2nd edition, 1987. Celluloses are natural carbohydrate high polymers (polysaccharides) consisting of anhydroglucose units joined by an oxygen linkage to form long molecular chains that are essentially linear. Cellulose can be hydrolyzed to form glucose. The degree of polymerization ranges from 1000 for wood pulp, to 3500 for cotton fiber, giving a molecular weight of from 160,000 to 560,000. Cellulose can be extracted from vegetable tissues (wood, grass, and cotton). Celluloses can be used in the form of fibers.

The naturally-occurring fibers or particulate fillers which can be employed in the practice of the present invention for preparing the composition are, for example, wood flour, wood pulp, wood fibers, cotton, flax, hemp, or ramie fibers, rice or wheat straw, chitin, chitosan, cellulose materials derived from agricultural products, nut shell flour, corn cob flour, and mixtures thereof.

The following working examples are given to illustrate the invention and should not be construed as limiting its scope. Unless otherwise indicated, all parts and percentages are by weight.

EXAMPLE 1

Native starch and PHAE (made from D.E.R.™ 383, Trademark of The Dow Chemical Company, and monoethanolamine, with a $T_g$ of −75° C.) were fed via separate feeders into a Werner feeders 30 mm twin-screw extruder. The water of the incoming starch was measured. Sufficient water was pumped directly into the extruder at a rate to make the final water content of the mixture 18 weight percent. The feed rates were: starch 36.6 pounds/hour, PHAE 3.84 pounds/hour, and water 2.85 pounds/hour. The screw rpm was 185, die pressure was 850 psi, the extruder zone temperatures were 40° C., 69° C., 82° C., 84° C., and 82° C. for Zones 1 through 4 and the four-strand die, respectively. The extruder employed in this example was divided into four lengthwise zones of substantially equal lengths comprising Zone 1, Zone 2, Zone 3 and Zone 4. Zone 1 through most of Zone 2 are single-flighted conveying elements. At the end of Zone 2, there is one diameter of kneading block (the length is equal to the diameter of the extruder). In Zone 3, there are two diameters of conveying elements (length is twice the diameter of the extruder), followed by one diameter of kneading blocks. The remainder of the screw are all single-flighted conveying elements. The resultant strand was chopped into pellets. Unmixed pellets of PHAE could be observed in the strand (the PHAE pellets were dyed red in order to observe the state of dispersion). The pellets were suitable for subsequent thermoplastics processing.

EXAMPLE 2

90 parts by weight of wheat starch (Midsol™ 50) and 10 parts PHAE (same as Example 1) were mixed in a Henchel mixer with sufficient water to bring the composition to 18 percent water. This composition was fed into a Brabender single screw 0.75 inch, 24:1 extruder. The screw was 3:1 compression constant taper. Zones 1 to 3 and die temperatures were 60° C., 110° C., 135° C., and 135° C., respectively. The extruder employed in this example was divided into three lengthwise zones of substantially equal lengths comprising Zone 1, Zone 2 and Zone 3. The resultant extruder was run at 10 rpm. A slit die was used instead of a strand die with the advantage of better observing the dispersion (the PHAE pellets were dyed red). The extruded tape was light pink in color and no undispersed PHAE pellets were observed.

EXAMPLE 3

The procedure of Example 1 was followed except that PHAE made from D.E.R. 383, monoethanolamine, and resorcinol diglycidyl ether (RDGE) (50 weight percent RDGE to D.E.R. 383) and a $T_g$ of 55° C., was used. The PHAE was also dyed, blue in this case, and showed a higher degree of dispersion upon compounding than Example 1. The extrudate was light blue in color with a few darker blue areas.

What is claimed is:

1. A process for preparing a starch-based thermoplastic hydroxy-functional polyether comprising (1) feeding from about 40 to about 98 weight percent starch and from about 2 to about 60 weight percent of a thermoplastic hydroxy-functional polyether derived from monomers containing 1 or more epoxy groups into a processing equipment at a temperature and for a time sufficient to provide a compounded mixture of the components and then forming the compounded mixture into pellets, the thermoplastic hydroxy-functional polyether being selected from the group consisting of:

1) hydroxy-functional polyethers having repeating units represented by the formula:

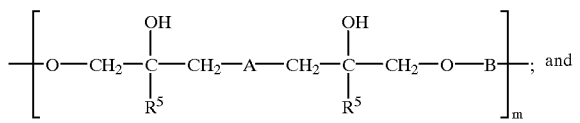

I

; and (2) hydroxy-functional polyethers having repeating units represented by the formula:

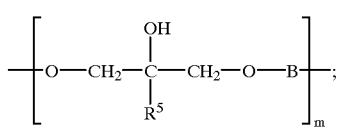

II

;

wherein $R^5$ is hydrogen or alkyl, $R^6$ is independently an organic moiety which is selected from the group consisting of alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide; $R^7$ is independently hydrogen or methyl, A is an amine moiety or a combination of different amine moieties; B is a divalent organic moiety which is selected from the group consisting of alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide; m is an integer from 10 to about 1000, n is an integer from about 0 to about 100, and x and y are independently integers from 0 to 100.

2. The process of claim 1 wherein the thermoplastic hydroxy-functional polyether has repeating units represented by the formula:

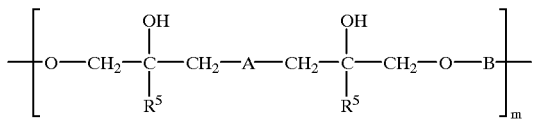

wherein A is an amine moiety or a combination of different amine moieties; B is a divalent organic moiety which is selected from the group consisting of alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene substituted with at least one hydroxyl group; arylene, dialkylenearylene, diaryleneketone, diarylenesulfone, diarylene oxide and diarylene sulfide; $R^5$ is alkyl or hydrogen; and m is an integer from 10 to 1000.

3. The process of claim 1, wherein the thermoplastic hydroxy-functional polyether is represented by the formula:

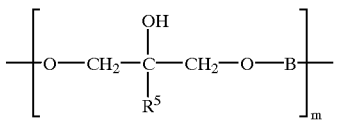

wherein B is a divalent organic moiety which is selected from the group consisting of alkylene, cycloalkylene, alkylenearylene, poly(alkyleneoxyalkylene), alkylenethioalkylene, alkylenesulfonylalkylene, alkylene substituted with at least one hydroxyl group, cycloalkylene substituted with at least one hydroxyl group, alkylenearylene substituted with at least one hydroxyl group, poly(alkyleneoxyalkylene) substituted with at least one hydroxyl group, alkylenethioalkylene substituted with at least one hydroxyl group, alkylenesulfonylalkylene Substituted with at least one hydroxyl group; arylene, dialkylenearylene, diaryleneketone, diarylenesulfone, diarylene oxide and diarylene sulfide; and $R^5$ is alkyl or hydroger, and m is an integer from 10 to 1000.

4. The process of claim 1, wherein the starch is derived from grains.

5. The process of claim 4, wherein the starch is a granular starch.

6. The process of claim 4, wherein the starch is a thermoplastic starch.

* * * * *